United States Patent
Desmarais

[11] Patent Number: 5,961,144
[45] Date of Patent: Oct. 5, 1999

[54] FOLDED COMBINATION HORN PAD AND DRIVER POSITION SENSOR ASSEMBLY AND METHOD FOR PROVIDING THE ASSEMBLY

[75] Inventor: Mark R. Desmarais, Canton, Mich.

[73] Assignee: TRW Inc., Lyndhurst, Ohio

[21] Appl. No.: 08/968,622

[22] Filed: Nov. 12, 1997

[51] Int. Cl.⁶ .......................... B60R 21/22; B60R 21/32
[52] U.S. Cl. .......................... 280/731; 280/735; 701/45; 307/10.1
[58] Field of Search ................... 280/731, 735, 280/728.3; 701/45; 307/10.1; 200/61.54

[56] References Cited

U.S. PATENT DOCUMENTS

| | | |
|---|---|---|
| 4,066,851 | 1/1978 | White et al. . |
| 4,251,734 | 2/1981 | Mayer et al. . |
| 5,157,372 | 10/1992 | Langford . |
| 5,269,559 | 12/1993 | Filion et al. . |
| 5,309,135 | 5/1994 | Langford . |
| 5,338,059 | 8/1994 | Inoue et al. . |
| 5,366,241 | 11/1994 | Kithil . |
| 5,369,232 | 11/1994 | Leonelli . |
| 5,398,962 | 3/1995 | Kropp . |
| 5,399,819 | 3/1995 | Lang et al. . |
| 5,423,569 | 6/1995 | Reighard et al. . |
| 5,465,998 | 11/1995 | Davis . |
| 5,489,806 | 2/1996 | Harris et al. . |
| 5,520,412 | 5/1996 | Davis . |
| 5,539,259 | 7/1996 | Filion et al. . |
| 5,549,323 | 8/1996 | Davis ........................................ 280/735 |
| 5,576,684 | 11/1996 | Langford . |
| 5,602,734 | 2/1997 | Kithil . |
| 5,722,686 | 3/1998 | Blackburn et al. ...................... 280/731 |
| 5,836,609 | 11/1998 | Coleman ................................. 280/731 |

OTHER PUBLICATIONS

"Capacitive Proximity Sensor Has Longer Range", NASA Tech Briefs, Aug. 1992.

U.S. Patent application Serial No. 08/442,190, for Method and Apparatus for Sensing an Occupant Position Using Capacitive Sensing; Inventors: Blackburn, et al., filed May 16, 1995 (copy not enclosed).

*Primary Examiner*—Peter C. English
*Attorney, Agent, or Firm*—Tarolli, Sundheim, Covell, Tummino & Szabo

[57] ABSTRACT

An apparatus (12) is a combination horn pad and driver position sensor. The apparatus (12), in its function as a horn pad, provides a signal to a horn activator circuit (30) when a deforming pressure is applied to the apparatus. The horn activator circuit (30) causes an audible horn (28) to sound. The apparatus (12), in its function as a driver position sensor, senses a distance between a vehicle driver (22) and the apparatus. A driver/monitor circuit (60) is operatively connected to the apparatus (12) to operate the apparatus in its sensor function, and to provide a signal (58) regarding the sensed distance to a controller (50) of an inflatable restraint system (20). The apparatus (12) has a field-effect circuit (e.g., 74) and a ground plate circuit (e.g., 76), for providing the sensor function, and a horn pad circuit (e.g., 78). The apparatus (12) also has a sheet of substrate material, which is folded to define a plurality of planar portions (e.g., 68–72) for providing a plurality of stacked parallel circuit areas. The three circuits (74–78) extend on the planar portions (68–72).

42 Claims, 3 Drawing Sheets

FOLDED COMBINATION HORN PAD AND DRIVER POSITION SENSOR ASSEMBLY AND METHOD FOR PROVIDING THE ASSEMBLY

TECHNICAL FIELD

The present invention is directed to vehicle electrical systems, and is particularly directed to an apparatus having electrical components of preferably two systems and a method for providing the apparatus. The two systems are an occupant restraint system and an audible horn system.

BACKGROUND OF THE INVENTION

Occupant restraint systems for use in vehicles are known in the art. One type of restraint system includes an actuatable restraint module that has an inflatable restraint, which is commonly referred to as an air bag. The air bag is inflated within a vehicle occupant compartment upon the occurrence of a condition for which a vehicle occupant is to be restrained. An example of such a condition is a vehicle collision.

Restraint systems having one or more adjustable aspects to tailor performance of the restraint module are known. Such a restraint system is commonly referred to as a "smart" restraint system. One example of an adjustable aspect is the dynamic deployment profile of the air bag. Specifically, the inflation timing, the inflation pressure, and the positioning of the inflated air bag are adjustable. Adjustments are based upon at least one sensed occupant characteristic.

One or more occupant sensors are provided in a smart restraint system to sense the occupant characteristic(s). A restraint system may include occupant sensors such as: a weight sensor for sensing weight of an occupant, a seat belt sensor for sensing whether the occupant is secured by a seat belt webbing system, an ultrasound or infrared sensor for sensing position of the occupant, and/or a capacitive sensor for sensing position of the occupant. As occupant restraint systems become more complex, a greater number of sensors are used to sense a greater number of occupant characteristics.

A capacitive sensor of a smart restraint system is often located in front, with reference to the vehicle, of the occupant. For a front seat passenger, such a sensor is located within an instrument or dashboard panel of the vehicle. For a driver of the vehicle, such a sensor is located within a steering wheel of the vehicle. Also mounted within the steering wheel is a driver side restraint module and components for other electrical systems of the vehicle. Specifically, the steering wheel contains a horn activation pad for an audible horn system of the vehicle.

There are continual needs for increasing the manufacturing efficiency and for increasing space utilization efficiency of the components of all vehicle systems.

SUMMARY OF THE INVENTION

The present invention includes an apparatus for providing control signals for at least one vehicle system. First circuit means, of the apparatus, senses distance between a vehicle occupant and the first circuit means, and provides a signal indicative thereof. Second circuit means senses deformation of the second circuit means caused by pressure applied to the second circuit means and provides a signal indicative thereof. Substrate means supports the first and second circuit means in a stacked arrangement. The substrate means includes means defining a plurality of planar portions for providing a plurality of stacked, substantially parallel circuit areas. The first circuit means extends on one of the circuit areas. The second circuit means extends on another one of the circuit areas.

In accordance with another aspect, the present invention includes an apparatus for providing control signals for at least one vehicle system. First circuit means, of the apparatus, senses distance between a vehicle occupant and the first circuit means, and provides a signal indicative thereof. Second circuit means senses deformation of the second circuit means caused by pressure applied to the second circuit means and provides a signal indicative thereof. A sheet of substrate material of the apparatus is folded to define a plurality of planar portions for providing a plurality of stacked, substantially parallel circuit areas. The first circuit means extends on one of the circuit areas of the substrate material. The second circuit means extends on another one of the circuit areas of the substrate material.

In accordance with a further aspect, the present invention includes an apparatus for providing control signals for at least one vehicle system. First circuit means, of the apparatus, senses an electric field indicative of distance between a vehicle occupant and the first circuit means, and provides a signal indicative thereof. Second circuit means directs the electric field sensed by the first circuit means. Substrate means supports the first and second circuit means in a stacked arrangement. The substrate means includes means defining a plurality of planar portions for providing a plurality of stacked, substantially parallel circuit areas. The first circuit means extends on one of the circuit areas. The second circuit means extends on another one of the circuit areas.

In accordance with a further aspect, the present invention includes an apparatus for providing control signals for at least one vehicle system. First circuit means, of the apparatus, senses an electric field indicative of distance between a vehicle occupant and the first circuit means, and provides a signal indicative thereof. Second circuit means directs the electric field sensed by the first circuit means. A sheet of substrate material of the apparatus is folded to define a plurality of planar portions for providing a plurality of stacked, substantially parallel circuit areas. The first circuit means extends on one of the circuit areas of the substrate material. The second circuit means extends on another one of the circuit areas of the substrate material.

In accordance with another aspect, the present invention includes a method for providing an apparatus that outputs control signals for at least one vehicle system. A plurality of planar portions of substrate material is provided. Each planar portion has a circuit area. Mounting a first circuit means on a first one of the circuit areas, such that the first circuit means extends on the first circuit area. The first circuit means senses distance between a vehicle occupant and the first circuit means and provides a signal indicative thereof. Mounting a second circuit means on a second one of the circuit areas, such that the second circuit means extends on the second circuit area. The second circuit means senses pressure applied to the second circuit means and provides a signal indicative thereof.

In accordance with another aspect, the present invention includes a method for providing an apparatus that outputs control signals for at least one vehicle system. A sheet of foldable substrate material is provided. The sheet has a plurality of circuit areas. Mounting a first circuit means on a first one of the circuit areas of the substrate material, such that the first circuit means extends on the first circuit area of the substrate material. The first circuit means senses distance between a vehicle occupant and the first circuit means and provides a signal indicative thereof. Mounting a second circuit means on a second one of the circuit areas of the substrate material, such that the second circuit means extends on the second circuit area of the substrate material. The second circuit means senses pressure applied to the second circuit means and provides a signal indicative thereof. Folding the substrate material so as to impose the first circuit area over the second circuit area, such that the first circuit area with the first circuit means is stacked upon the second circuit area with the second circuit means.

In accordance with yet another aspect, the present invention includes a method for providing an apparatus that outputs control signals for at least one vehicle system. A sheet of foldable substrate material is provided. The sheet has a plurality of circuit areas. Mounting a first circuit means on a first one of the circuit areas of the substrate material, such that the first circuit means extends on the first circuit area of the substrate material. The first circuit means senses an electric field indicative of distance between a vehicle occupant and the first circuit means and provides a signal indicative thereof. Mounting a second circuit means on a second one of the circuit areas of the substrate material, such that the second circuit means extends on the second circuit area of the substrate material. The second circuit means directs the electric field sensed by the first circuit means. Folding the substrate material so as to impose the first circuit area over the second circuit area, such that the first circuit area with the first circuit means is stacked upon the second circuit area with the second circuit means.

BRIEF DESCRIPTION OF THE DRAWINGS

The foregoing and other features and advantages of the present invention will be apparent to one skilled in the art upon consideration of the following description taken in connection with the accompanying drawings, wherein.

DESCRIPTION OF PREFERRED EMBODIMENT

Figure 1:
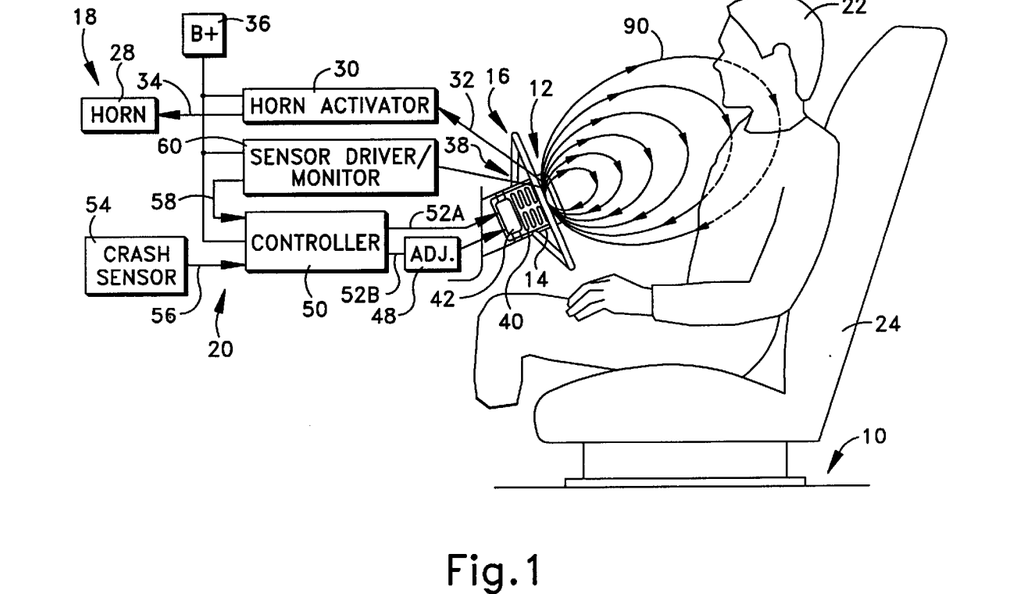
FIG. 1 is a schematic illustration of a vehicle containing an apparatus in accordance with the present invention.

A portion of a vehicle 10 that includes an apparatus 12, in accordance with the present invention, is schematically illustrated in FIG. 1. The apparatus 12 is a combination assembly of a horn pad and driver position sensor, and is located in a hub 14 of the vehicle's steering wheel 16. The function of the apparatus 12 as a horn pad is for an audible horn system 18 and the function of the apparatus as a driver position sensor is for a driver-side occupant restraint system 20. Accordingly, the apparatus 12 is associated with a driver 22 seated on a driver's seat 24 of the vehicle 10.

The horn system 18 includes a horn 28 and a horn activator circuit 30, both of the type well known in the art. In response to a signal 32 from the apparatus 12, the horn activator circuit 30 provides an electrical energy signal 34, such as from a vehicle battery 36, to energize the horn 28. When energized, the vehicle horn 28 emits an audible sound. The horn 28 is used to alert other persons within the vicinity of the vehicle 10.

The restraint system 20 includes a restraint module 38, which has an inflatable restraint 40 and a source 42 of inflation fluid for inflating the inflatable restraint. The inflatable restraint 40 is commonly referred to as air bag, and is stored in a folded condition within the restraint module 38. The source 42 of inflation fluid includes a stored quantity of pressurized inflation fluid and/or an inflation fluid generating material. Upon actuation of the restraint module 38, the source 42 provides the inflation fluid to the air bag 40 in a manner well understood by a person of ordinary skill in the art.

The restraint module 38 (FIG. 2) is located in the hub 14 of the steering wheel 16 along with the apparatus 12. Within the hub 14, the apparatus 12 is located adjacent to the restraint module 38, on the side of the restraint module that faces the driver 22. A resilient cover 44 caps the end of the hub 14 facing the driver 22 and encloses the apparatus 12 and the restraint module 38 within the hub.

The restraint system 20 (FIG. 1) has at least one adjustable aspect 48, which is controllable to adjust actuation of the restraint module 38. For example, the dynamic deployment profile of the air bag 40 is adjustable. Examples of deployment adjustment include adjustment of inflation timing, adjustment of inflation pressure, and adjustment of location of the inflated air bag 40 relative to the driver 22. An example of adjustment of inflation pressure is control of a pressure relief valve that vents inflation fluid. An example of adjustment of air bag positioning is control of a placement of the inflated air bag. The positioning is accomplished by directing inflation fluid into the air bag 40 in predetermined zones within the air bag or by re-pointing the entire restraint module 88 via moving devices, e.g., motors.

Control of the restraint module 38 and the adjustable aspect(s) 48 is by a controller 50, which provides control signals 52A, 52B. The controller 50 receives sensory input from several sources, and using the sensory input, makes control determinations. One of the sensory inputs to the controller 50 is from a crash sensor 54. The crash sensor 54 senses a vehicle condition for which the driver 22 is to be restrained, and provides a signal 56 to the controller 50 indicative of the sensed vehicle condition. In the preferred embodiment, the crash sensor 54 is an accelerometer and the signal 56 is an electrical signal indicative of the sensed crash acceleration. Upon the occurrence of a crash condition, the accelerometer outputs an electric signal having a characteristic indicative of the crash condition. The controller 50 evaluates the accelerometer output signal 56 via one or more crash algorithms. The algorithm(s) is/are based on crash acceleration, the integral of crash acceleration (i.e., crash velocity), the double integral of crash acceleration (i.e., crash displacement), and/or the derivative of crash acceleration (i.e., crash jerk).

Another sensory input to the controller 50 results from the apparatus 12 in its driver position sensing function, and is provided via a signal 58 from a driver/monitor circuit 60. The driver position, as sensed by the apparatus 12 in its position sensing function, is used for control of the adjustable aspect(s) 48, such that, upon actuation of the restrain module 38, the air bag 40 hopefully enhances restraint of the driver 22.

Figure 2:
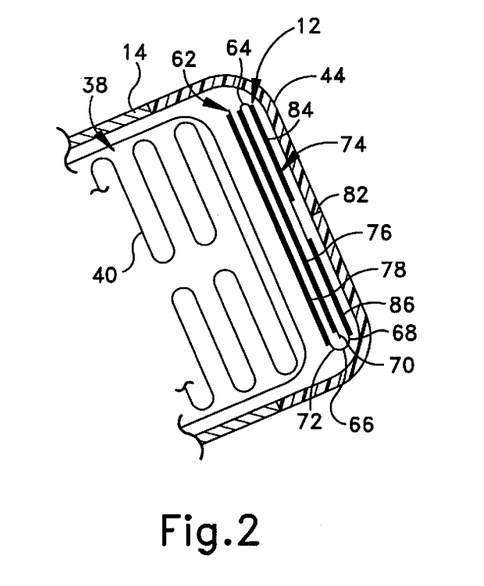
FIG. 2 is a schematic cross-sectional view of the steering wheel hub shown in FIG. 1, which contains the folded apparatus in accordance with the present invention.
Figure 3A:
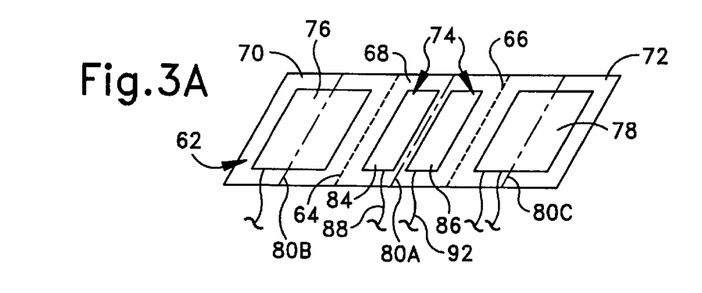
FIGS. 3A–3C are schematic illustrations of a folding process in accordance with the present invention for providing the folded apparatus shown in FIG. 2.

Focusing now on the apparatus 12 (FIG. 2), the apparatus is preferably a folded assembly, which has a sheet 62 as a base component. The sheet 62 is made of dielectric material. In an unfolded state, the dielectric sheet 62 extends in a single plane (FIG. 3A). The thickness of the dielectric sheet 62 is small compared to its major unfolded dimensions (i.e., length and width) of the sheet. The dielectric sheet 62 is readily flexible, such that the sheet is readily foldable. The sheet remains flexible in the folded condition.

The folded dielectric sheet 62 (FIG. 2) has first and second folds (or fold-lines) 64 and 66, which divide the sheet into first, second, and third planar portions 68, 70, and 72, respectively. In the folded condition, the second planar portion 70 is located between the first and third planar portions 68 and 72 in a stack, and all of the planar portions are parallel to each other. The dielectric sheet 62 is illustrated as having relatively loose folds 64 and 66, with the planar portions 68–72 spaced a relatively large distance from each other. The loose folds and spacing is for illustration purposes only, i.e., to permit observation of the structure of the folded apparatus 12. In actuality, the folded dielectric sheet 62 has tighter folds, with the planar portions in closer proximity than as illustrated (i.e., the folded apparatus 12 has a thin profile).

Affixed to extend on the first planar portion 68 of the dielectric sheet 62 is a field-effect circuit 74. Affixed to extend on the second planar portion 70 of the sheet is a ground plate circuit 76. Affixed to extend on the third planar portion 72 of the sheet is a horn pad circuit 78. The three circuits 74–78 extend across a large part of their respective planar portions 68–72 of the dielectric sheet 62. The three circuits 74–78 are schematically shown in the Figures as heavy lines/boxes. Preferably, the three circuits 74–78 include portions that are made of conductive material deposited on the dielectric sheet using flexible circuit printing technology well known in the art. For example, the horn pad circuit 78 may be made using by printing with a resistive ink that changes resistance when submitted to a strain.

Preferably, the three circuits 74–78 are located on a principal or obverse side (in the unfolded condition) of the dielectric sheet 62 (FIG. 3A). Also, preferably, a secondary or reverse side of the dielectric sheet 62 does not have any circuitry located thereon. The folds 64 and 66 are between the adjacent circuits 74–78, and the circuits 74–78 are in a stacked array when the dielectric sheet 62 is folded (FIG. 2).

As viewed in FIG. 3A, in an unfolded state of the dielectric sheet 62, the first planar portion 68 of the sheet is in the center, the second planar portion 70 is on the left, and the third planar portion 72 is on the right. The ground plate circuit 76 is on the left portion, the field-effect circuit 74 is on the center portion, and the horn pad circuit 78 is on the right portion.

Figure 3B:
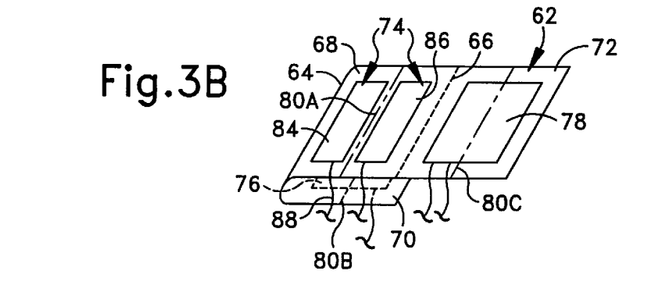
Figure 3C:
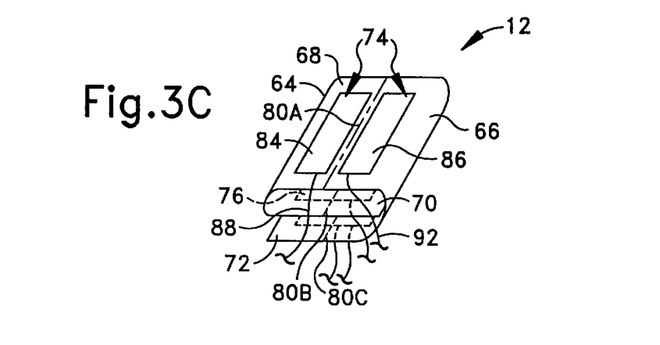

In order to provide the folded apparatus 12, the left/second planar portion 70 is folded (FIG. 3B) beneath the center/first planar portion 68, and then the right/third planar portion 72 is folded beneath the second planar portion 70 (FIG. 3C). Accordingly, the first planar portion 68 becomes a top portion (as viewed in FIG. 3C), the second planar portion 70 becomes a middle portion, and the third planar portion 72 becomes a bottom portion. The field-effect circuit 74 faces outward. Accordingly, the field-effect circuit 74 is "stacked above" the ground plate circuit 76 with two segments of the dielectric sheet 62 interposed between the field-effect circuit and the ground plate circuit. Similarly, the horn pad circuit 78 is "stacked" beneath the field-effect circuit 74 and the ground plate circuit 76. One layer of the dielectric sheet 62 is between the horn pad circuit 78 and the ground plate circuit 76.

The folded apparatus 12 is located in the hub 14 (FIG. 2) of the steering wheel 16, with the field-effect circuit 74 immediately adjacent to the cover 44 and the horn pad circuit 78 facing the restraint module 38. Preferably, the field-effect circuit 74 directly engages the inner surface of the hub cover 44. Also, preferably, the folded apparatus 12 is held adjacent to the hub cover 44 by mechanical or adhesive means. Electrical connections are made to the circuit elements on each of the three folded portions using appropriate and known electrical connection techniques.

Figures 4, 5:
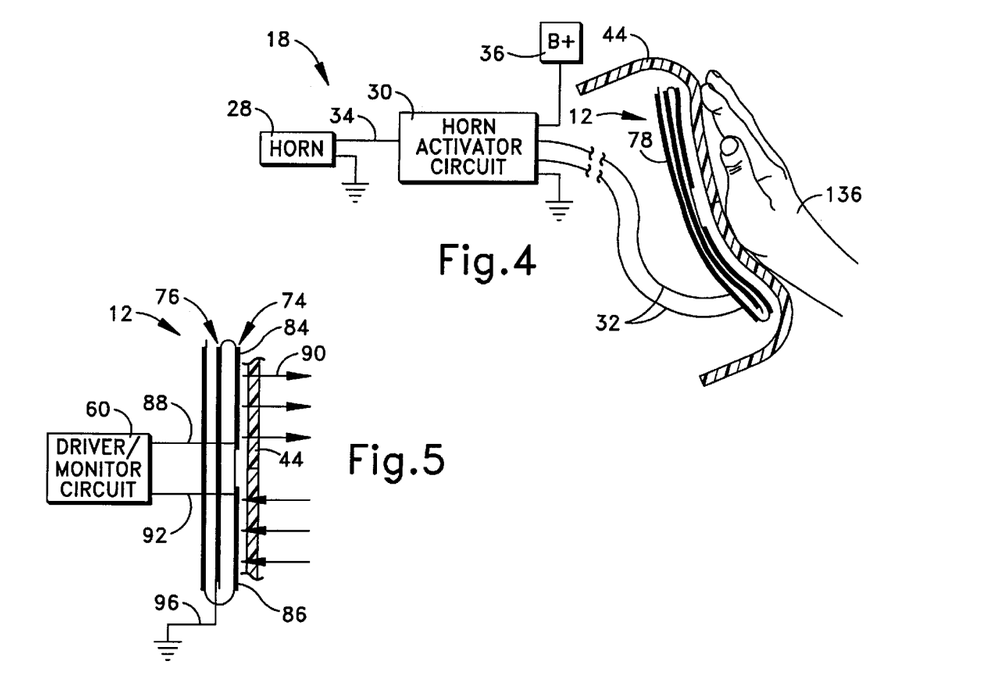
FIG. 4 is an exaggerated schematic illustration of an audible horn system of the vehicle of FIG. 1, and shows the folded apparatus functioning as a horn pad of the horn system.
FIG. 5 is a schematic illustration of a sensor portion of a restraint system of the vehicle of FIG. 1, and shows the folded apparatus functioning as a sensor.

The dimensions of the folded apparatus 12 are such that the folded apparatus extends across a large percent of the area under the hub 14 facing the driver 22. Further, the hub cover 44 is made of resilient, flexible material such that the hub cover flexes upon being pushed by the driver 22 (FIG. 4, exaggerated). Preferably, the hub cover 44 is made of an elastomeric compound, such as rubber, and is molded. When the hub cover 44 is flexed, the folded apparatus 12 commensurately flexes.

The dielectric sheet 62 has a tear seam 80A–80C (FIG. 3A) in each of the respective planar portions 68–72. The seams 80A–80C are perforation lines or reduced thickness lines, and allow the dielectric sheet to tear at the tear seams easier than at other locations of the sheet. The tear seams 80A–80C extend from one edge of the dielectric sheet to the opposite edge, and extend substantially parallel to the fold lines 64 and 66. Each tear seam 80A–80C extends generally across the middle of the associated planar portion 68–72.

With the folded apparatus 12 in the steering wheel hub 14 (FIG. 2), the tear seams 80A–80C are aligned with a tear seam 82 in the hub cover 44. The tear seam 82 of the hub cover 44 is a portion of the hub cover that tears easier than other portions of the hub cover. For example, the tear seam 82 is a portion of reduced thickness of the hub cover 44. Preferably, the tear seam 82 extends substantially horizontally across the hub cover 44 when the steering wheel 16 is in a neutral-steer position. During a deployment of the air bag 40 in response to a detected crash condition, the inflating air bag presses on the folded apparatus 12 and thus the hub cover 44. Due to the pressing force from the expanding air bag 40, the tear seams 80A–80C and 82 tear to permit passage of a portion of the inflating air bag past the apparatus 12 and the hub cover 44, and into an operative restraining position for the driver 22.

Focusing now on the driver sensor aspect of the folded apparatus 12, the field-effect circuit 74 (FIG. 5) and the ground plate circuit 76 provide the sensor function of the apparatus. The field-effect circuit 74 includes at least one drive plate 84 and at least one detector plate 86. The plate 84 is connected, via connection 88, to the driver/monitor circuit 60. The driver/monitor circuit 60 causes the plate 84 to emit an electric field 90. The electric field 90 passes, substantially unaffected, through the cover 44, and permeates a space surrounding the plate 84 of the field-effect circuit 74. The plate 86 "detects" the electric field 90, and provides a field detect signal, via connection 92, back to the driver/monitor circuit 60.

Figure 6:
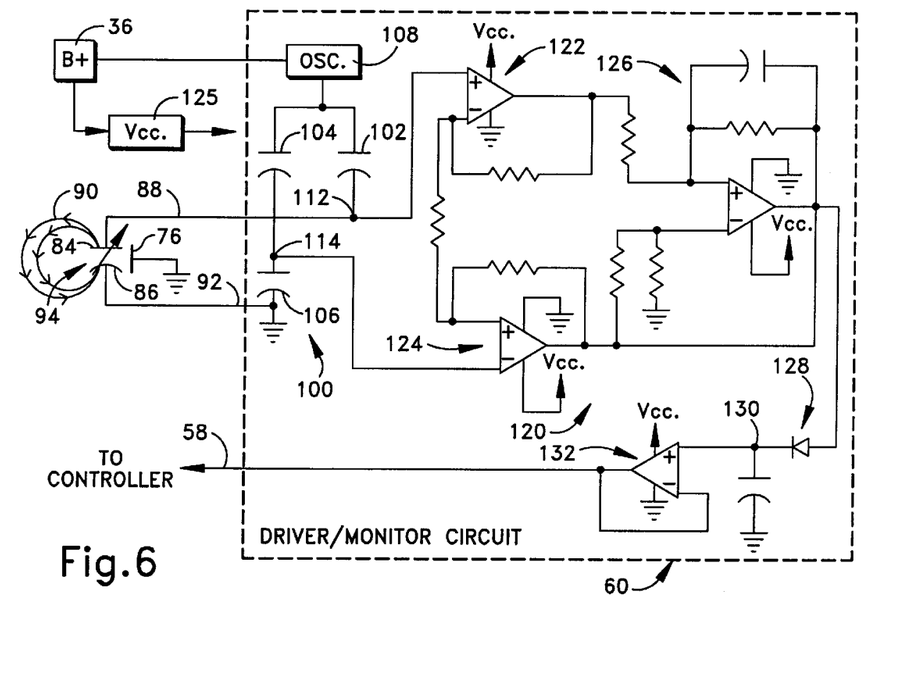
FIG. 6 is a schematic illustration showing details of the sensor shown in FIG. 5.

The plates 84 and 86 act as the electrodes of a variable capacitor 94 (FIG. 6). The capacitance of the capacitor 94 is dependent upon the dielectric constant of the "material" effectively "between" the two plates. The presence and location of the driver 22, as a result of capacitive coupling, affect this dielectric constant. Capacitive coupling as a means to detect a human body is possible because the human body has an electrical conductivity and has a dielectric constant different than air. Thus, the capacitance between the plate 84 and the plate 86 is related to the presence and position of the driver. As will be understood by a person of ordinary skill in the art, the capacitive value is dependent upon the distance from the driver to the field-effect circuit 74. The measured capacitance is used to determine the distance between the driver 22 and the field-effect circuit 74.

The ground plate circuit 76 is connected to vehicle ground 96 and attenuates or blocks the portion of the electric field 90 which impinges upon the ground plate circuit. Accordingly, the electric field 90 is "directed" toward the driver 22, thus improving the ability of the field-effect circuit 74 to detect the position of the driver and nullifying the capacitance disturbing effects caused by other vehicle components. Such a combination of a field-effect circuit 74 and a ground plate circuit 76 is commonly referred to as a capacitive coupling proximity sensor or a capciflector sensor. An example of such a sensor is disclosed in *Capacitive Proximity Sensor Has Longer Range*, NASA Technical Briefs, August 1992.

One embodiment of the driver/monitor circuit 60 is schematically shown in FIG. 6. The driver/monitor circuit 60 measures the capacitance value of the capacitor 94 and outputs the signal 58 to controller 50 indicative of the capacitance value. The variable capacitor 94 defined by the plates 84, 86 is connected in a capacitor Wheatstone bridge circuit 100. The bridge circuit 100 includes a fixed value capacitor 102 connected in series with the variable capacitor 94. Series connected fixed value capacitors 104, 106 are connected in parallel with the capacitors 102, 94. The bridge circuit 100 is operatively connected to an oscillating drive source 108 that applies an oscillating electrical signal to the bridge. The oscillating drive source 108 is powered via the vehicle battery 36. Preferably, the drive signal from source 108 is approximately at 100 kHz.

Junction 112 between capacitors 102 and 94 and junction 114 between capacitors 104 and 106 are operatively connected to a differential measuring circuit 120. The differential measuring circuit 120 includes amplifier circuits 122, 124 connected to the junctions 112, 114, respectively. The amplifier circuits 122, 124 are powered by a regulated voltage source $V_{cc}$ 125, which is operatively connected to the battery 36.

The outputs of amplifier circuits 122, 124 are connected to an integrator circuit 126, which is also operatively connected to the regulated voltage supply $V_{cc}$ 125. The output of the integrator circuit 126 is connected to a rectifier circuit 128 having a diode and capacitor. The signal at diode/capacitor junction 130 of the rectifier circuit 128 is an analog signal having a DC voltage value indicative of the capacitance value of capacitor 94. This voltage value at junction 130 is connected to controller 50 through a voltage follower circuit 132, which is also operatively connected to the regulated voltage supply $V_{cc}$ 125. The output from the voltage follower circuit 132 is the signal 58. The voltage value of the output signal 58 is indicative of the occupant's position relative to the field-effect circuit 74, and, thus the hub 14 and the enclosed restraint module 38.

Focusing now on the horn pad aspect of the folded apparatus 12, the horn pad circuit 78 has electrical characteristics that change when the horn pad circuit is deformed or flexed (e.g., when pushed). Preferably, the horn pad circuit 78 has a resistance, which changes, when the horn pad circuit is deformed. Examples of such horn pad circuits are disclosed in U.S. Pat. Nos. 5,309,135 and 5,576,724, to Langford, which are hereby incorporated herein by reference. The details of the horn pad circuit 78 of the apparatus 12 are omitted for brevity.

Referred to FIG. 4, deformation of the horn pad circuit 78 occurs when a hand 136 of the driver 22 pushes on the flexible hub cover 44. The horn activator circuit 30 senses the characteristic change due to the deformation, and, in response thereto, activates the horn 28. For example, a current is passed through the horn pad circuit 78 from the horn activator circuit 30 and the current is increasingly impeded as the horn pad circuit is deformed (e.g., resistance of circuit 78 increases as the folded apparatus is deformed). The horn activator circuit 30 monitors the current flow, which is indicative of the resistance of the horn pad circuit 78. When the monitored impedance exceeds a predetermined threshold, the horn activator circuit 30 provides the electrical energy signal 34 from the battery 36 to the horn 28. Thus, the horn activator circuit 30 provides a connection (e.g., closure of a relay switch) between the battery 36 and the horn 28, to cause the horn to emit the audible sound.

During operation of the vehicle 10, the driver/monitor circuit 60 operates the field-effect circuit 74, and the position of the driver 22 is continuously monitored. The controller 50 provides appropriate control signals 52B to the adjustable aspect(s) 48 for adjustment(s) that is/are continuously modified in response to driver position. Also, the controller 50 updates driver characteristic values in air bag control algorithms, which are employed during deployment of the air bag 40. These air bag control algorithms responsive to occupant position are known in the art. At any time, the driver 22 can press on the hub cover 44 to cause the audible horn 28 to sound. The controller 50 includes appropriate filtering in the air bag control arrangement so that a driver blowing the horn is not interpreted as an occupant sitting with his chest against hub cover 44.

Upon the occurrence of a vehicle condition for which the driver is to be restrained with the air bag 40 (i.e., a vehicle collision), the controller 50 provides the actuation signal 52A to actuate the source 42 of inflation fluid. Actuation of the source 42 causes inflation fluid to flow into the folded air bag 40. The air bag 40 expands, forcing its way through the apparatus folded 12 and the hub cover 44, and out of the steering wheel hub 14. As mentioned, the apparatus 12 is a thin film structure that readily tears at tear seams 80A–C when the air bag force push against it during deployment. The dynamic deployment of the air bag 40 is adjusted based upon the monitored driver position.

Figure 7:
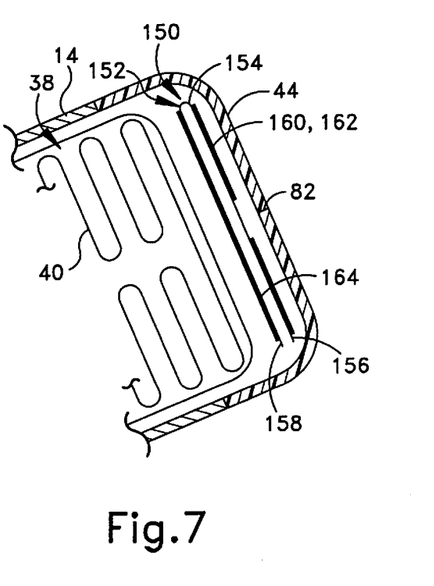
FIG. 7 is a view similar to FIG. 2 illustrating a second embodiment of the present invention.

A second embodiment of the present invention is shown in FIG. 7. The second embodiment is an apparatus 150. The apparatus 150 is similar to the folded apparatus 12 (FIG. 2) of the first embodiment in that it is a combination assembly of a horn pad and a driver position sensor located within the hub 14 of the vehicle steering wheel 16. The apparatus 150 is a folded assembly, which has a sheet 152 as a base component. The sheet 152 is made of the same dielectric material as the sheet 62 (FIG. 2) of the first embodiment.

In an unfolded state of the dielectric sheet 152 (FIG. 8A), the sheet extends in a single plane. The folded dielectric sheet 152 has a single fold (or fold line) 154, which divides the sheet into first and second planar portions 156 and 158, respectively. In the folded condition, the second planar portion is located "beneath" or "behind" the first planar portion 156. Similar to the first embodiment, the dielectric sheet 152 is illustrated as having relatively loose folds, with the planar portions 156 and 158 spaced at a relatively great distance. The loose folds and spacing is for illustration purposes only.

A field-effect circuit 160 and a horn pad circuit 162 are affixed to extend on the first planar portion 156 of the dielectric sheet 152. The field-effect circuit 160 and the horn pad circuit 162 may be separate, adjacent circuits or may be combined such that common, shared elements provide one function for the field-effect circuit and another function for the horn pad circuit. A ground plate circuit 164 is affixed to extend on the second planar portion 158 of the dielectric sheet 152. Similar to the first embodiment (FIG. 2), the three circuits 160–164 (FIG. 7) of the second embodiment extend across a large portion of their respective planar portions 156, 158, and are schematically shown in the figures as heavy lines/boxes. Also similar to the first embodiment (FIG. 2), the three circuits 160–164 (FIG. 7) of the second embodiment are made of conductive material deposited upon the dielectric sheet 152 using flexible circuit printing technology.

Figure 8A:
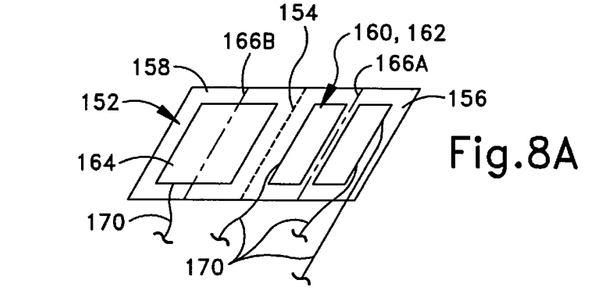
FIGS. 8A and 8B are schematic illustrations showing a folding process in accordance with the present invention for providing the folded apparatus shown in FIG. 7.
Figure 8B:
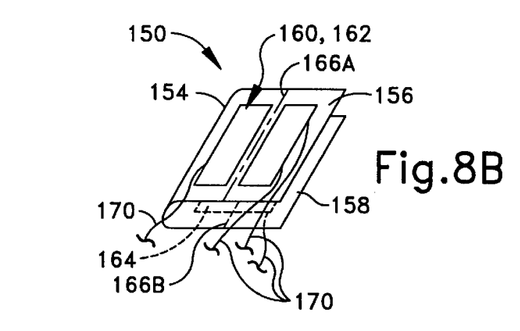

Preferably, the circuits 160–164 are located on a principal side surface of the dielectric sheet 152 (FIG. 8A). The fold 154 is located between the ground circuit 164 and the other circuits 160 and 162. In the folded condition of the apparatus 150, the ground plate circuit 164 is stacked behind the other circuits 160 and 162 (FIG. 8B). Further, in the folded condition of the apparatus 150, two segments of the dielectric sheet 152 are interposed between the ground plate circuit 164 and the other circuits 160 and 162.

The folded apparatus 150 is located in the hub 14 (FIG. 7) of the steering wheel 16, with the field-effect circuit/horn pad circuit 160/162 immediately adjacent to the cover 44, and the ground plate circuit 164 facing the restraint module 38. Similar to the first embodiment (FIG. 2), the folded apparatus 150 (FIG. 7) engages the inner surface of the hub cover 44, and is held in place by appropriate mechanical or adhesive means. The dimensions of the folded apparatus 150 of the second embodiment are similar to the dimensions of the folded apparatus 12 of the first embodiment. Further, similar to the first embodiment, when the hub cover 44 is flexed, the folded apparatus 150 of the second embodiment flexes.

The dielectric sheet 152 of the second embodiment has tear seams 166A and 166B (FIG. 8A) in the planar portions 156 and 158, respectively. The tear seams 166A and 166B are similar to the tear seams 80A–80C of the first embodiment and function in a similar manner to permit passage of the inflating air bag 40.

Appropriate connection leads 170 extend from the circuits 160–164 of the apparatus 150 to a horn activator circuit, a sensor driver/monitor circuit, and ground, similar to the first embodiment. The apparatus 150 functions to monitor the driver's position for control of adjustable aspects of a restraint system and also functions as a horn pad of an audible horn system.

For example, the field-effect circuit 160 is responsive to the presence and location of the driver 22, via capacitive coupling. A driver/monitor circuit, such as shown in FIG. 6, measures the location indicative capacitance valve. The ground plate circuit 164 functions to direct the electric field, as in the first embodiment. The horn pad circuit 162, although conjointly located with the field-effect circuit 160 on the first planar portion 156 of the dielectric sheet 152, functions the same as the horn pad circuit 78 of the first embodiment. Specifically, the resistance of the horn pad circuit 162 increases as the circuit is deformed.

From the above description of the invention, those skilled in the art will perceive improvements, changes and modifications. For example, the stacked "assembly", with the overlaid circuits, could be made using stacked layers of dielectric material. Also, one or more of the dielectric material layers, which separate the circuits, could be created via a deposition or printing process. A deposited or printed layer of dielectric material may be applied to one of the circuits, with a second one of the circuits applied to the applied layer of dielectric material. Further, the circuits may be located on opposite sides of the same dielectric material sheet. Improvements, changes and modifications within the skill of the art are intended to be covered by the appended claims.

Having described the invention, I claim:

1. An apparatus for providing control signals for at least one vehicle system, said apparatus comprising:

first circuit means for sensing distance between a vehicle occupant and said first circuit means, and for providing a signal indicative thereof;

second circuit means for sensing deformation of said second circuit means caused by pressure applied to said second circuit means, and for providing a signal indicative thereof; and substrate means for supporting said first and second circuit means in a stacked arrangement, said substrate means including means defining a plurality of planar portions for providing a plurality of stacked, substantially parallel circuit areas in said stacked arrangement, said first circuit means extending on one of said circuit areas, and said second circuit means extending on another one of said circuit areas.

2. An apparatus as set forth in claim 1, wherein said substrate means includes a folded sheet of substrate material folded, said defined planar portions are on said sheet of substrate material and adjacent to at least one fold.

3. An apparatus as set forth in claim 1, wherein the at least one vehicle system for which said apparatus provides control signals includes an occupant restraint system having an adjustable aspect, and an audible horn system, said signal provided by said first circuit means is for control of the adjustable aspect of the occupant restraint system, and said signal provided by said second circuit means indicative of deformation results in an audible signal being emitted from the horn system.

4. An apparatus as set forth in claim 1, wherein said first circuit means includes a field-effect circuit for detecting a capacitance of an electric field and a ground plate circuit for controlling the electric field.

5. An apparatus as set forth in claim 4, wherein said means defining a plurality of planar portions defines three planar portions, said field-effect circuit of said first circuit means extends on the circuit area of a first one of said planar portions, said ground plate circuit of said first circuit means extends on the circuit area of a second one of said planar portions, and said second circuit means extends on the circuit area of a third one of said planar portions.

6. An apparatus as set forth in claim 5, wherein said second planar portion with the ground plate circuit is located between the first and third planar portions.

7. An apparatus as set forth in claim 4, wherein said field-effect circuit and said second circuit means extend on the circuit area of a first one of the planar portions, and said ground plate circuit extends on the circuit area of a second one of the planar portions.

8. An apparatus as set forth in claim 1 including means for mounting said apparatus within a vehicle steering wheel hub between a driver's side restraint module and a steering wheel hub cover such that said first circuit means senses a distance between a vehicle driver and said first circuit means.

9. An apparatus for providing control signals for at least one vehicle system, said apparatus comprising:

first circuit means for sensing distance between a vehicle occupant and said first circuit means, and for providing a signal indicative thereof;

second circuit means for sensing deformation of said second circuit means caused by pressure applied to said second circuit means, and for providing a signal indicative thereof; and a sheet of substrate material folded to define a plurality of planar portions for providing a plurality of stacked, substantially parallel circuit areas, said first circuit means extending on one of said circuit areas of said sheet of substrate material, and said second circuit means extending on another one of said circuit areas of said sheet of substrate material.

10. An apparatus as set forth in claim 9, wherein the at least one vehicle system for which said apparatus provides control signals includes an occupant restraint system having an adjustable aspect, and an audible horn system, said signal provided by said first circuit means is for control of the adjustable aspect of the occupant restraint system, and said signal provided by said second circuit means indicative of deformation results in an audible signal being emitted from the horn system.

11. An apparatus as set forth in claim 9, wherein said first circuit means includes a field-effect circuit for detecting a capacitance of an electric field and a ground plate circuit for controlling the electric field.

12. An apparatus as set forth in claim 11, wherein said sheet has two folds and defines three planar portions, said field-effect circuit of said first circuit means extends on the circuit area of a first one of said planar portions, said ground plate circuit of said first circuit means extends on the circuit area of a second one of said planar portions, and said second circuit means extends on the circuit area of a third one of said planar portions.

13. An apparatus as set forth in claim 12, wherein said second planar portion with the ground plate circuit is located between the first and third planar portions.

14. An apparatus as set forth in claim 11, wherein said field-effect circuit and said second circuit means extend on the circuit area of a first one of the planar portions, and said ground plate circuit extends on the circuit area of a second one of the planar portions.

15. An apparatus as set forth in claim 9, wherein said substrate material is flexible in response to pressure applied by a hand of the vehicle occupant.

16. An apparatus as set forth in claim 15, wherein said second circuit means is flexible to deform upon flexing of said sheet of substrate material.

17. An apparatus as set forth in claim 9, wherein said sheet of substrate material is made of dielectric material.

18. An apparatus as set forth in claim 9 including means for mounting said apparatus within a vehicle steering wheel hub between a driver's side restraint module and a steering wheel hub cover such that said first circuit means senses a distance between a vehicle driver and said first circuit means.

19. An apparatus for providing control signals for at least one vehicle system, said apparatus comprising:

first circuit means for sensing an electric field indicative of distance between a vehicle occupant and said first circuit means, and for providing a signal indicative thereof;

second circuit means for directing the electric field sensed by said first circuit means; and substrate means for supporting said first and second circuit means in a stacked arrangement, said substrate means including means defining a plurality of planar portions for providing a plurality of stacked, substantially parallel circuit areas in said stacked arrangement, said first circuit means extending on one of said circuit areas, and said second circuit means extending on another one of said circuit areas.

20. An apparatus as set forth in claim 19, wherein the at least one vehicle system for which said apparatus provides control signals includes an occupant restraint system having an adjustable aspect, said signal provided by said first circuit means is for control of the adjustable aspect of the occupant restraint system.

21. An apparatus as set forth in claim 19, wherein said first circuit means includes a field-effect circuit for detecting a capacitance of the electric field, said second circuit means includes a ground plate circuit for controlling the electric field.

22. An apparatus as set forth in claim 21 including a horn pad circuit for sensing deformation of said horn pad circuit caused by pressure applied to said horn pad circuit, and for providing a signal indicative thereof, and wherein said means defining a plurality of planar portions defines three planar portions, said field-effect circuit of said first circuit means extends on the circuit area of a first one of said planar portions, said ground plate circuit of said second circuit means extends on the circuit area of a second one of said planar portions, and said horn pad circuit extends on the circuit area of a third one of said planar portions.

23. An apparatus as set forth in claim 22, wherein said second planar portion with the ground plate circuit is located between the first and third planar portions.

24. An apparatus as set forth in claim 19 including means for mounting said apparatus within a vehicle steering wheel hub between a driver's side restraint module and a steering wheel hub cover such that said first circuit means senses a distance between a vehicle driver and said first circuit means.

25. An apparatus for providing control signals for at least one vehicle system, said apparatus comprising:

first circuit means for sensing an electric field indicative of distance between a vehicle occupant and said first circuit means, and for providing a signal indicative thereof;

second circuit means for directing the electric field sensed by said first circuit means; and a sheet of substrate material folded to define a plurality of planar portions for providing a plurality of stacked, substantially parallel circuit areas, said first circuit means extending on one of said circuit areas of said sheet of substrate material, and said second circuit means extending on another one of said circuit areas of said sheet of substrate material.

26. An apparatus as set forth in claim 25, wherein the at least one vehicle system for which said apparatus provides control signals includes an occupant restraint system having an adjustable aspect, said signal provided by said first circuit means is for control of the adjustable aspect of the occupant restraint system.

27. An apparatus as set forth in claim 25, wherein said first circuit means includes a field-effect circuit for detecting a capacitance of the electric field, said second circuit means includes a ground plate circuit for controlling the electric field.

28. An apparatus as set forth in claim 27 including a horn pad circuit for sensing deformation of said horn pad circuit caused by pressure applied to said horn pad circuit, and for providing a signal indicative thereof, and wherein said sheet has two folds and defines three planar portions, said field-effect circuit of said first circuit means extends on the circuit area of a first one of said planar portions, said ground plate circuit of said second circuit means extends on the circuit area of a second one of said planar portions, and said horn pad circuit extends on the circuit area of a third one of said planar portions.

29. An apparatus as set forth in claim 28, wherein said second planar portion with the ground plate circuit is located between the first and third planar portions.

30. An apparatus as set forth in claim 27 including a horn pad circuit for sensing deformation of said horn pad circuit caused by pressure applied to said horn pad circuit, and for providing a signal indicative thereof, and wherein said field-effect circuit and said horn pad circuit extend on the circuit area of a first one of the planar portions, and said ground plate circuit extends on the circuit area of a second one of the planar portions.

31. An apparatus as set forth in claim 25 including means for mounting said apparatus within a vehicle steering wheel hub between a driver's side restraint module and a steering wheel hub cover such that said first circuit means senses a distance between a vehicle driver and said first circuit means.

32. A method for providing an apparatus which outputs control signals for at least one vehicle system, said method comprising:

providing a plurality of planar portions of substrate material, each planar portion having a circuit area;

mounting first circuit means, which senses distance between a vehicle occupant and the first circuit means and which provides a signal indicative thereof, on a first one of the circuit areas such that the first circuit means extends on the first circuit area; and mounting second circuit means, which senses deformation of the second circuit means caused by pressure applied to the second circuit means and which provides a signal indicative thereof, on a second one of the circuit areas such that the second circuit means extends on the second circuit area.

33. A method for providing an apparatus which outputs control signals for at least one vehicle system, said method comprising:

providing a sheet of foldable substrate material, which has a plurality of circuit areas;

mounting first circuit means, which senses distance between a vehicle occupant and the first circuit means and which provides a signal indicative thereof, on a first one of the circuit areas of the substrate material such that the first circuit means extends on the first circuit area of the substrate material;

mounting second circuit means, which senses deformation of the second circuit means caused by pressure applied to the second circuit means and which provides a signal indicative thereof, on a second one of the circuit areas of the substrate material such that the second circuit means extends on the second circuit area of the substrate material; and folding the sheet of substrate material to impose the first circuit area over the second circuit area, such that the first circuit area, with the first circuit means, is stacked upon the second circuit area, with the second circuit means.

34. A method as set forth in claim 33, wherein said step of folding includes folding the sheet substrate material twice to define three planar portions.

35. A method as set forth in claim 34, wherein said step of mounting the first circuit means includes providing a field-effect circuit portion of the first circuit means, which detects a capacitance of an electric field, to extend on a first one of the planar portions of the sheet, and providing a ground plate circuit portion of the first circuit means, which controls the electric field, to extend on a second one of the planar portions of the sheet, and wherein said step of mounting the second circuit means includes providing the second circuit means to extend on a third one of the planar portions.

36. A method as set forth in claim 33, wherein said step of folding includes folding the sheet of substrate material once to define two planar portions.

37. A method as set forth in claim 36, wherein said step of providing the first circuit means includes providing a field-effect circuit portion of the first circuit means, which detects a capacitance of an electric field, to extend on a first one of the planar portions of the sheet, and providing a ground plate circuit portion of the first circuit means, which controls the electric field, to extend on a second one of the planar portions of the sheet; and wherein said step of providing the second circuit means includes providing the second circuit means to extend on the first planar portion.

38. A method for providing an apparatus which outputs control signals for at least one vehicle system, said method comprising:

providing a sheet of foldable substrate material, which has a plurality of circuit areas;

mounting first circuit means, which senses an electric field indicative of distance between a vehicle occupant and the first circuit means and which provides a signal indicative thereof, on a first one of the circuit areas of the substrate material such that the first circuit means extends on the first circuit area of the substrate material;

mounting second circuit means, which directs the electric field sensed by the first circuit means, on a second one of the circuit areas of the substrate material such that the second circuit means extends on the second circuit area of the substrate material; and folding the sheet of substrate material to impose the first circuit area over the second circuit area, such that the first circuit area, with the first circuit means, is stacked upon the second circuit area, with the second circuit means.

39. A method as set forth in claim 38, wherein said step of folding includes folding the sheet substrate material twice to define three planar portions.

40. A method as set forth in claim 39 including providing a horn pad circuit, which senses deformation of the horn pad circuit caused by pressure applied to the horn pad circuit and which provides a signal indicative thereof, on one of the planar portions.

41. A method as set forth in claim 38, wherein said step of folding includes folding the sheet of substrate material once to define two planar portions.

42. A method as set forth in claim 41 including providing a horn pad circuit, which senses deformation of the horn pad circuit caused by pressure applied to the horn pad circuit and which provides a signal indicative thereof, on the same one of the planar portions as the first circuit means.

* * * * *